(12) United States Patent
Porzio et al.

(10) Patent No.: US 8,802,174 B2
(45) Date of Patent: Aug. 12, 2014

(54) METHOD OF PREPARING COFFEE INFUSIONS AND MACHINE FOR ACHIEVING SAME

(75) Inventors: Giancarlo Porzio, Villastanza Di Parabiago (IT); Carlo Carbonini, Villastanza Di Parabiago (IT)

(73) Assignee: Ranchilio Group S.p.A., Villastanza di Parabiago (IT)

( * ) Notice: Subject to any disclaimer, the term of this patent is extended or adjusted under 35 U.S.C. 154(b) by 0 days.

(21) Appl. No.: 13/989,310

(22) PCT Filed: Nov. 23, 2011

(86) PCT No.: PCT/IB2011/055254
§ 371 (c)(1),
(2), (4) Date: Jun. 7, 2013

(87) PCT Pub. No.: WO2012/070002
PCT Pub. Date: May 31, 2012

(65) Prior Publication Data
US 2013/0259995 A1    Oct. 3, 2013

(30) Foreign Application Priority Data
Nov. 24, 2010 (IT) .............................. TO2010A0930

(51) Int. Cl.
*A47J 31/36* (2006.01)

(52) U.S. Cl.
USPC ........................................... 426/433; 99/300

(58) Field of Classification Search
USPC ........................................... 426/433; 99/300
See application file for complete search history.

(56) References Cited

U.S. PATENT DOCUMENTS

| | | | |
|---|---|---|---|
| 4,583,449 A | 4/1986 | Dangel et al. | |
| 5,297,472 A * | 3/1994 | Suzuki et al. | 99/289 T |
| 6,199,472 B1 * | 3/2001 | Greiwe | 99/291 |
| 7,698,992 B2 * | 4/2010 | Wei | 99/281 |

FOREIGN PATENT DOCUMENTS

| | | | |
|---|---|---|---|
| DE | 198 41 680 C1 | | 3/2000 |
| EP | 73496 | * | 3/1983 |

(Continued)

OTHER PUBLICATIONS

Mechanical English Translation for EP 73496 published Mar. 1983.*

(Continued)

*Primary Examiner* — Anthony Weier
(74) *Attorney, Agent, or Firm* — Sughrue Mion, PLLC

(57) ABSTRACT

The present invention relates to a machine for preparing coffee infusions by means of a liquid under pressure, in particular water under pressure, the machine comprising: a pump assembly (11) arranged to raise the pressure of the liquid outgoing from the pump assembly up to a preset pressure value (PI); one or more dispensing units (14) connected to the pump assembly, each dispensing unit (14) being arranged to dispense the coffee infusion; one or more pressure managing devices (20), each managing device (20) being connected to a certain dispensing unit (14). In the machine (10), the pressure managing device (20) includes a first duct (15) and at least one second duct (16) that are connected in parallel, have a common outlet and are arranged to supply the dispensing unit (14), during the coffee infusion preparation, with liquid at different pressures. The invention further concerns the pressure managing device (20) and a method of preparing the coffee infusion, including dynamically modifying the pressure during the infusion preparation.

14 Claims, 2 Drawing Sheets

(56) References Cited

FOREIGN PATENT DOCUMENTS

| EP | 0 934 719 A1 | 8/1999 |
| EP | 1 308 115 A1 | 5/2003 |
| EP | 2 027 798 A1 | 2/2007 |
| EP | 1 839 541 A1 | 10/2007 |
| JP | 2000-83828 A | 3/2000 |

OTHER PUBLICATIONS

International Search Report for PCT/IB2011/055254 dated Feb. 21, 2012.

* cited by examiner

METHOD OF PREPARING COFFEE INFUSIONS AND MACHINE FOR ACHIEVING SAME

CROSS REFERENCE TO RELATED APPLICATIONS

This application is a National Stage of International Application No. PCT/IB2011/055254 filed Nov. 23, 2011, claiming priority based on Italian Patent Application No. TO2010A000930 filed Nov. 24, 2010, the contents of all of which are incorporated herein by reference in their entirety.

TECHNICAL FIELD

The present invention generally relates to an espresso coffee machine comprising one or more dispensing units.

More particularly, the present invention relates to a coffee machine in which the possibility of dispensing coffee from the dispensing units by means of water at different supply pressure values is provided.

PRIOR ART

As known, in the field of coffee machines for bars, the requirement has recently arisen of finely controlling parameters or variables such as pressure and/or temperature values.

Considering, as far as the present invention is concerned, the values of the supply pressure, the reference literature in the field of coffee machines, in particular espresso coffee machines, has always defined a constant pressure of 9 bar as the ideal pressure value for preparing espresso coffee.

Thus, the prior art generally teaches generating a given constant value of the supply pressure (pressure) inside the espresso coffee machine by means of a motor-pump assembly, heating the water under pressure by means of a boiler and supplying the hot water under pressure through the dispensing unit so as to prepare espresso coffee.

Yet, in recent years, the market of coffee producers is addressing to the creation of coffee mixtures that are more and more valuable and sensitive to the physical variables concerned in espresso coffee preparation. Pressure is one of the main variables, since its value determines the "cooking" of the coffee and consequently its organoleptic performance.

Taking into account the need to have coffee "cooking values" that are dependent on the type of mixture being used, it is realised that the prior art machines have a number of technical problems.

A first problem in the prior art machines is that supply pressure regulation is generally a wholly manual operation, allotted to a specialised technician.

Indeed, in order to modify the pressure, the technician has to access the inside of the machine and to modify the supply pressure of the motor-pump assembly. The new supply pressure however remains fixed until a possible subsequent intervention, again by a specialised technician.

A second problem is related to the possibility of having different pressures in the dispensing units.

For the sake of understanding, generally espresso coffee machines have up to a maximum of four dispensing units, but a single pressure source. Thus, the pressure generated by the motor-pump assembly is the same for all units and it does not allow mutually independent regulations.

A third problem, caused by the constant supply pressure, is a non-constant coffee cooking during its extraction.

As known, in a first dispensing phase (pre-brewing), the resistance offered by the dispensing unit, comprising filter and coffee powder dose, is maximum; then, in a second phase (brewing), the resistance offered by the dispensing unit decreases, and hence the coffee dispensing is quicker since, according to the prior art, the pressure remains always constant; lastly, in a third phase (post-brewing), the resistance offered by the dispensing unit becomes almost zero, so that a flow of aqueous coffee occurs.

U.S. Pat. No. 4,583,449 discloses a construction scheme of a coffee machine comprising, for each dispensing unit, two water supply ducts arranged in parallel and alternating in operation, which ducts then join together near the boiler. The first duct is directly connected to the dispensing unit through the boiler and allows preparing coffee by means of hot water at the mains pressure. The second duct, connected to the dispensing unit through the boiler, includes a pump arranged to increase the water pressure so as to allow preparing espresso coffee.

First of all, the prior art document has the problem of demanding a pump for each dispensing unit, and hence it is particularly complex and, consequently, prone to possible failures.

In any case, the prior art document does not solve the problems set forth above of regulation flexibility and coffee "cooking" uniformity during the dispensing phases.

DESCRIPTION OF THE INVENTION

It is an object of the present invention to solve the problems mentioned above of the prior art.

In particular, it is an object of the present invention to meet the need to carry out a uniform coffee "cooking" during the dispensing phases.

The object is achieved by the coffee machine and the method of carrying out a uniform coffee "cooking" as claimed herein.

The claims are integral part of the technical teaching provided herein in respect of the invention.

According to a feature of a preferred embodiment, the coffee machine comprises a single pump assembly and one or more units dispensing the coffee infusion, and each dispensing unit is associated with a pressure managing device arranged to supply the respective dispensing unit at variable pressures during the coffee brewing process.

More particularly, according to a feature of a first embodiment, the pressure managing device includes a first duct and at least one second duct that are connected in parallel and are supplied by the pump assembly, the first duct comprises a valve device electronically controlled by a control unit and the second duct comprises at least pressure reducing means.

According to another feature, the coffee machine according to the invention allows applying, for instance: in a first phase or pre-brewing phase, a first pressure arranged to uniformly "wet" the coffee mixture and to uniformly extract coffee; in a second phase, or brewing phase, a second pressure, for instance higher than the previous one or even equal to the previous one, in order to extract the best organoleptic characteristics of the coffee mixture and to ensure a uniform "cooking", with coffee cream emulsion; and, in a third phase or post-brewing phase, a third pressure, for instance lower than the previous one and lower than or equal to the first pressure, in order to avoid an aqueous coffee extraction when the coffee resistance is almost zero.

According to a further feature of the present invention, a barman can easily profile the pressure behaviour in wholly independent manner for each dispensing unit, so that the barmen can wholly exploit the characteristics of particularly selected coffee powders, even if not used or not known at present.

BRIEF DESCRIPTION OF THE DRAWINGS

The above and other features and advantages of the invention will become apparent from the following description of preferred embodiments, made by way of non limiting example with reference to the accompanying drawings, in which elements denoted by a same or similar numerical reference correspond to elements having the same or similar function and construction and in which.

DETAILED DESCRIPTION OF PREFERRED EMBODIMENTS

Figure 1:
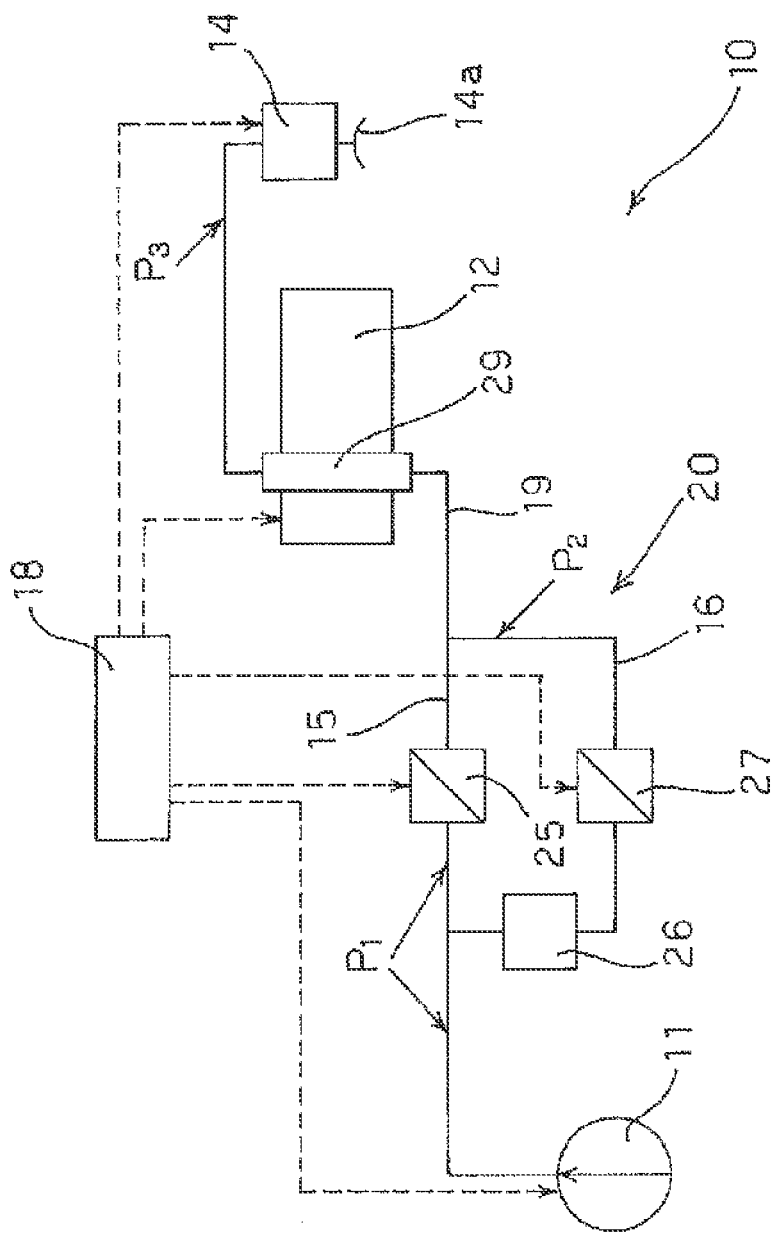
FIG. 1 schematically shows a first embodiment of the present invention.

Referring to FIG. 1, a coffee machine 10, for instance an espresso coffee machine according to a first embodiment of the present invention, includes a plurality of machine devices, such as a boiler 12 associated for instance with a heat exchanging unit 29, one or more dispensing units 14 associable with respective filter holders containing, in use, coffee powder doses, and respective nozzles 14a, said components being arranged to enable preparing espresso coffee.

The machine further comprises a control unit 18 connected to various machine devices or units and arranged, as it will be disclosed below in detail, to control the operation of boiler 12, of each dispensing unit 14 and of the devices the control unit is connected to.

Among the various machine devices, machine 10 also comprises a pump 11, for instance a positive displacement pump hydraulically supplied with water from the mains or with a liquid contained in a tank, the pump being arranged to raise the water pressure up to a preset pressure P1, e.g. 9 bar.

In the preferred embodiment, a single pump is provided, independently of the number of dispensing units 14, and it might even be located outside machine 10.

In accordance with the preferred embodiment, a pressure managing device 20 comprising two channels or ducts 15 and 16, respectively, connected to pump 11, is provided downstream pump 11 for each dispensing unit 14.

The first duct 15 comprises a valve device 25, for instance an electrically operated valve, controlled by control unit 18 and arranged to turn on or off the supply of water at pressure P1 to the respective dispensing unit 14.

The second duct 16 is arranged in parallel with the first duct 15 and comprises, for instance, a pressure reducing device (pressure reducer) 26 arranged to reduce pressure P1 to a pressure P2, e.g. 4 bar, and a second valve device 27, for instance an electrically operated valve, controlled by control unit 18 and arranged to turn on or off the supply of water at pressure P2, lower than pressure P1, to the respective dispensing unit 14. The second valve, if turned on simultaneously with the turning off of the first electrically operated valve 25, contributes to reducing the supply pressure.

In accordance with a first variant of the first embodiment, pressure reducer 26 might be different for each dispensing unit, so as to allow different pressure reduction levels in duct 16 upstream electrically operated valve 27.

In accordance with another variant of the first embodiment, duct 16 may for instance comprise pressure reducer 26 only and lack electrically operated valve 27.

In accordance with a further variant of the first embodiment, more than two ducts connected in parallel might be provided in pressure managing device 20. Each additional duct comprises devices corresponding to the devices provided in the second duct 16, but pressure reducers 26 may operate according to different values in the different ducts connected in parallel.

In the preferred embodiment, the ducts join into a single duct 19 leading to heat exchanger 29, of known type, and hence to dispensing unit 14.

In accordance with the present exemplary embodiment, control unit 18 is arranged to:
  control actuation of pump 11;
  control the independent turning on of the first and second electrically operated valves 25 and 27 associated with ducts 15 and 16 connected in parallel;
  control boiler 12 so as to manage values of the water supply temperature according to preset values;
  control the preparation of espresso coffee by means of the one or more dispensing units 14;
  receive, store and manage supply pressure profiles associable with each dispensing unit 14 or with all dispensing units 14 provided in machine 10.

During espresso coffee preparation, machine 10, as described, allows controlling at any instant (profiling) at least the water supply pressure at each dispensing unit, by suitably opening and closing the first and second valve 25 and 27, respectively, under the control of control unit 18.

Figure 2:
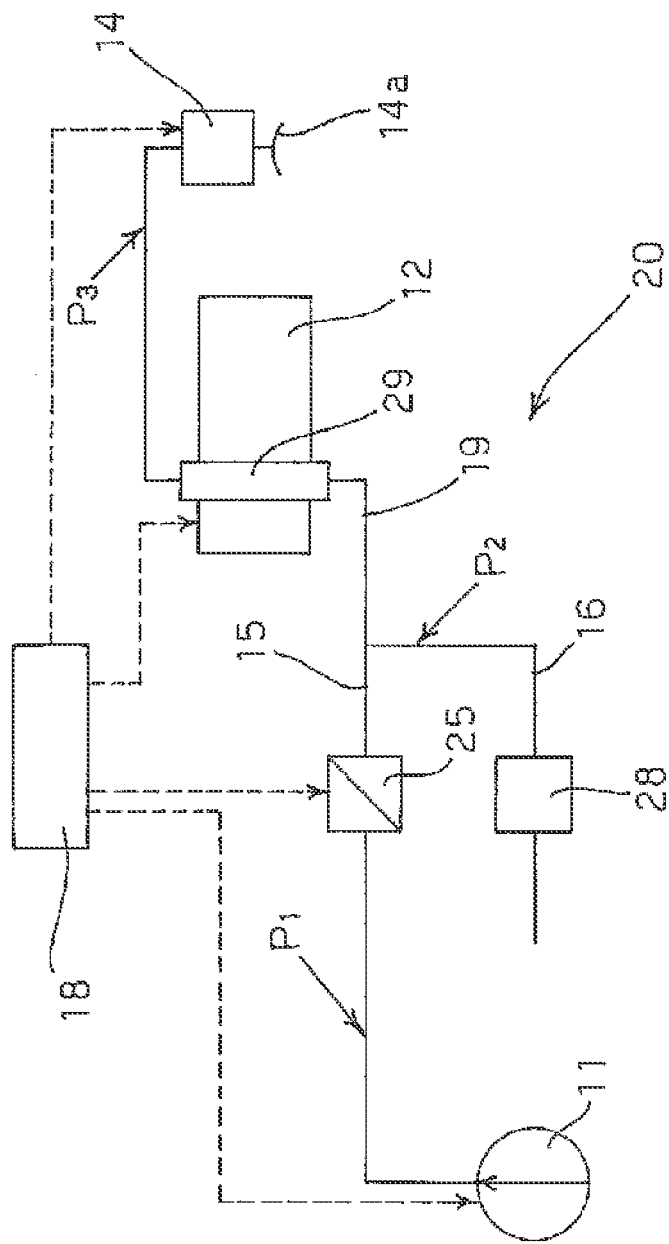
FIG. 2 schematically shows a second embodiment of the present invention.

In accordance with a second embodiment of the present invention, shown in FIG. 2, pressure managing device 20 comprises a first duct 15, substantially equivalent to the described one, and a second duct 16, arranged in parallel with the first duct 15 but directly supplied with water from the mains, for instance at pressure values P2 of about 2 to 4 bars, in any case lower than pressure P1 present in the first duct 15.

In accordance with the variant described herein, duct 16 comprises a valve 28, e.g. a non-return valve, arranged to prevent water at pressure P1 from flowing back to the second duct 16 supplying water at pressure P2 lower, in any case, than pressure P1.

In further embodiments, valve 28 might also be electronically controlled by control unit 18 in order to dynamically control the pressure of the liquid supplied to dispensing unit 14.

Also such embodiments allow profiling at any instant at least the water supply pressure of each dispensing unit 14, by suitably opening and closing, under the control of control unit 18, the first valve 25, which is the only valve being controlled, or the first and the second valve 25 and 28.

In accordance with another variant of such embodiment, more than two ducts connected in parallel and operating at mutually different pressures might be provided in pressure managing device 20.

The operation of the coffee machine as described, for instance according to the first embodiment, is as follows.

Once the barman has set a dispensing profile for a given dispensing unit 14 by means of control unit 18, the coffee dispensing process, which generally lasts about 25 seconds, proceeds in the following way:
  in the pre-brewing phase, having a duration of about 5 seconds, control unit 18 initially keeps the first valve 25 closed while leaving the second valve 27 open, and then, for instance after 3 seconds, it opens in pulsed manner the first valve 25 while leaving the second valve 27 open, so that a pressure P3 initially having a value P2 and subsequently a mean value in the range P1 to P2 is present at the dispensing unit;

in the brewing phase, having a duration of about 15 seconds, control unit 18 closes the second valve 27 and keeps the first valve 25 open, so that a pressure P3 equal to P1 is present at the dispensing unit and thus an optimal "cooking" of the coffee powder dose is performed;

in the post-brewing phase, having a duration of about 5 seconds, control unit 18 closes the first valve 25 and opens the second valve 27, so that a pressure P3 equal to P2 is present at the dispensing unit, whereby the latter is supplied with low-pressure water.

The operation may also be modified so that, in the pre-brewing phase, control unit 18 opens the first valve 25 and keeps the second valve 27 closed, so that a pressure P3 equal to P1 is present at the dispensing unit also in the pre-brewing phase.

In accordance with such a variant embodiment, however, in the post-brewing phase, control unit 18 closes the first valve 25 and opens the second valve 27, so that a pressure P3 equal to P2, and in any case lower than P1, is present at the dispensing unit.

Of course, in the case of the second embodiment, pressure P3 at the dispensing unit is managed by suitably controlling the first valve and by taking the pressure of water from the mains as reference pressure P2.

As it is evident from the description of the operation, given only by way of non limiting example, by suitably controlling the opening and closing of the first valve 25 and the second valve 27, if the latter is provided, it is possible to achieve at least the objective of supplying each dispensing unit 14 with water:

at a first pressure in the pre-brewing phase;
at a second pressure, preferably higher than the first pressure, in the brewing phase;
at a third pressure, preferably lower than the second pressure and lower than or equal to the first pressure, in the post-brewing phase.

Thanks to pressure managing device 20, as described, coffee machine 10 can:

use a single pressure source while simultaneously supplying multiple dispensing units 14;
allow profiling or modulating the water pressure at any instant during coffee dispensing, so as to enable a perfect "cooking" of the coffee powder dose; actually, in accordance with what has been disclosed, by exploiting the computing capabilities of control unit 18 and the two ducts at different pressures, it is possible to control the supply pressure at any instant so as to exploit in the best way the organoleptic properties of the coffee beverage;
allow using also a tank containing water or an equivalent liquid, without a direct connection to the water mains: actually, both different supply pressures can be generated by pressure managing device 20, for instance according to the first embodiment, by using a single pump 11 supplied, for instance, by a tank containing the water or the liquid necessary for the preparation of coffee infusions.

Of course, obvious changes and/or modifications can be made in the above description in respect of the components, the circuit elements and the connections, as well as in respect of the details of the illustrated construction and the operating manner, without departing from the invention as set forth in the following claims.

The invention claimed is:

1. A machine for preparing coffee infusions by means of a liquid under pressure, the machine being associated with a pump assembly arranged to raise the pressure of the liquid outgoing from the pump assembly up to a preset pressure value, said machine comprising:

one or more dispensing units connected to the pump assembly, each said dispensing unit being arranged to dispense the coffee infusion;
one or more pressure managing devices, each said pressure managing device being connected to a certain dispensing unit and including
a first duct and at least one second duct that are connected in parallel, have a common outlet and are arranged to supply the dispensing unit with liquid under pressure, the liquid pressure being different in each duct,
wherein
said first duct is arranged between said pump assembly and said dispensing unit and comprises a valve device electronically controlled by a control unit in order to dynamically control the pressure of the liquid supplied to the dispensing unit by closing/opening said valve;
wherein
said at least one second duct comprises a second valve device electronically controlled by the control unit in order to dynamically control the pressure of the liquid supplied to the dispensing unit by closing/opening said second valve.

2. The machine as claimed in claim 1, wherein said at least one second duct has a common inlet with said first duct and
a pressure reducing means arranged to reduce the pressure of the liquid outgoing from the pump assembly.

3. The machine as claimed in claim 1, wherein said at least one second duct is directly supplied with liquid by a main delivering liquid under pressure, said pressure being lower than the preset pressure value.

4. A machine for preparing coffee infusions by means of a liquid under pressure, the machine being associated with a pump assembly arranged to raise the pressure of the liquid outgoing from the pump assembly up to a preset pressure value, said machine comprising:

one or more dispensing units connected to the pump assembly, each said dispensing unit being arranged to dispense the coffee infusion;
one or more pressure managing devices, each of said pressure managing devices being connected to a certain dispensing unit and including
a first duct and at least one second duct that are connected in parallel, have a common outlet and are arranged to supply the dispensing unit with liquid under pressure, the liquid pressure being different in each duct,
wherein
said first duct is arranged between said pump assembly and said dispensing unit and comprises a valve device electronically controlled by a control unit in order to dynamically control the pressure of the liquid supplied to the dispensing unit by closing/opening said valve;
wherein
said at least one second duct is directly supplied with liquid by a mains delivering liquid under pressure, wherein said pressure is lower than the preset pressure value.

5. A device for managing pressure values of a liquid to be used for dispensing espresso coffee in a coffee machine, the device comprising
a first duct and at least one second duct that are connected in parallel, have a common outlet into a single duct connected upstream of a heat exchanger and are arranged to supply a dispensing unit with the liquid at a first pressure and at least one second pressure lower than the first pressure,
wherein
said first duct is connected downstream of a pump assembly and comprises a first valve device arranged to be electronically controlled in order to turn on/off the supply of the dispensing unit with the liquid at said first pressure, wherein said at least one second duct comprises a second valve device arranged to be electronically controlled in order to turn on/off the supply of the dispensing unit with the liquid at said second pressure;

said first duct and said at least one second duct are configured to operate in parallel when said first and said second valve device are both open.

6. The device for managing pressure values as claimed in claim 5, wherein said at least one second duct and said first duct have a common inlet into a single duct located downstream of said first duct and said second duct;

said at least one second duct comprises pressure reducing means arranged to reduce the pressure of the liquid outgoing from the pump assembly.

7. The device for managing pressure values as claimed in claim 5, wherein said at least one second duct is directly supplied with liquid by a mains delivering liquid at said second pressure.

8. A device for managing pressure values of a liquid to be used for dispensing espresso coffee in a coffee machine, the device comprising a first duct and at least one second duct that are connected in parallel, have a common outlet and are arranged to supply a dispensing unit with the liquid at a first pressure and at least one second pressure lower than the first pressure, wherein, said first duct comprises a valve device arranged to be electronically controlled in order to turn on/off the supply of the dispensing unit with the liquid at said first pressure, wherein said at least one second duct is directly supplied with liquid by a main delivering liquid at said second pressure;

said first duct and said at least one second duct are configured to operate in parallel when said first valve device is open.

9. A method of preparing coffee infusions by means of a coffee machine, said method comprising, during the period required of a dispensing unit to prepare the infusion by supplying a liquid under pressure, at least the steps of:

supplying, in a first phase or pre-brewing phase, said liquid at a first pressure;

supplying, in a second phase or brewing phase, said liquid at a second pressure higher than or equal to said first pressure;

supplying, in a third phase or post-brewing phase, said liquid at a third pressure lower than the second pressure;

wherein said supply in the different phases is carried out by:

providing a first duct and at least one second duct connected in parallel and having a common outlet connected to a dispensing unit of said coffee machine;

dynamically controlling at least one valve device provided in said first duct.

10. The method as claimed in claim 9, wherein:

in said pre-brewing phase, said liquid is supplied at a first pressure lower than said second pressure; and in said post-brewing phase, said liquid is supplied at a third pressure lower than or equal to the first pressure.

11. The machine of claim 1, wherein the liquid is water.

12. The machine of claim 2, herein said pressure reducing means includes a pressure reducer.

13. The machine of claim 4, wherein the liquid is water.

14. The device of claim 6, wherein said pressure reducing means includes a pressure reducer.

* * * * *

UNITED STATES PATENT AND TRADEMARK OFFICE
CERTIFICATE OF CORRECTION

PATENT NO. : 8,802,174 B2  
APPLICATION NO. : 13/989310  
DATED : August 12, 2014  
INVENTOR(S) : Giancarlo Porzio and Carlo Carbonini Page 1 of 1

It is certified that error appears in the above-identified patent and that said Letters Patent is hereby corrected as shown below:

Title Page, item (73),
Col. 1, Line 9: Delete "Ranchilio" and insert -- Rancilio --

Signed and Sealed this
Sixteenth Day of December, 2014

Michelle K. Lee
*Deputy Director of the United States Patent and Trademark Office*